United States Patent
Bofelli et al.

(10) Patent No.: US 11,152,777 B2
(45) Date of Patent: Oct. 19, 2021

(54) MEDIUM VOLTAGE SWITCHING APPARATUS

(71) Applicant: ABB Schweiz AG, Baden (CH)

(72) Inventors: Carlo Bofelli, Dalmine (IT); Andrea Bianco, Sesto San Giovanni (IT); Roberto Penzo, Milan (IT); Christian Reuber, Willich (DE); Fabio Mannino, Curno (IT); Elisabeth Lindell, Västerås (SE); Stefan Halén, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/903,481

(22) Filed: Jun. 17, 2020

(65) Prior Publication Data

US 2020/0403395 A1 Dec. 24, 2020

(30) Foreign Application Priority Data

Jun. 19, 2019 (EP) .................................... 19181346

(51) Int. Cl.
*H02H 3/02* (2006.01)
*H01H 9/56* (2006.01)
(Continued)

(52) U.S. Cl.
CPC ............ *H02H 3/021* (2013.01); *H01H 9/563* (2013.01); *H01H 33/666* (2013.01); *H02B 11/02* (2013.01)

(58) Field of Classification Search
CPC .......... H01H 3/021; H01H 3/26; H01H 9/563; H01H 31/02; H01H 33/666; H01H 11/02
See application file for complete search history.

(56) References Cited

U.S. PATENT DOCUMENTS

| | | | |
|---|---|---|---|
| 5,430,599 A * | 7/1995 | Charpentier | H01H 33/593 361/152 |
| 7,317,264 B2 * | 1/2008 | Kinsella | H01H 9/563 307/139 |

(Continued)

FOREIGN PATENT DOCUMENTS

| | | |
|---|---|---|
| EP | 2690643 A1 | 1/2014 |
| EP | 3051549 A1 | 8/2016 |
| EP | 3358587 A1 | 8/2018 |

OTHER PUBLICATIONS

European Patent Office, Extended Search Report issued in corresponding Application No. 19181346.8, dated Dec. 4, 2019, 7 pp.

*Primary Examiner* — Robert J Hoffberg
(74) *Attorney, Agent, or Firm* — Greenberg Traurig, LLP (57) ABSTRACT

The invention relates to a medium voltage switching apparatus. The medium voltage switching apparatus includes one or more electric poles, each electrically coupleable with a corresponding electric line; for each electric pole, a fixed contact and a movable contact, the movable contact being reversibly movable between a decoupled position from the fixed contact and a coupled position with the fixed contact, the movable contact moving from the decoupled position to the coupled position during an closing manoeuvre of the switching apparatus and moving from the coupled position to the decoupled position during an opening manoeuvre of the switching apparatus; and actuating means adapted to actuate the movable contacts of the one or more electric poles. A control unit is adapted to select and carry out a selectable control routine in response to receiving an input signal at an input arrangement corresponding to the selectable routine.

18 Claims, 8 Drawing Sheets

US 11,152,777 B2
Page 2

(51) Int. Cl.
*H01H 33/666* (2006.01)
*H02B 11/02* (2006.01)

(56) References Cited

U.S. PATENT DOCUMENTS

| | | | | |
|---|---|---|---|---|
| 7,545,245 | B2 * | 6/2009 | Zhou | H01H 3/227 |
| | | | | 200/18 |
| 7,576,957 | B2 * | 8/2009 | Zhou | H01H 9/563 |
| | | | | 361/2 |
| 9,142,375 | B2 * | 9/2015 | Besana | H01H 89/00 |
| 9,722,513 | B2 * | 8/2017 | Bock | H01H 9/563 |
| 9,726,726 | B2 * | 8/2017 | Bock | H01H 47/002 |
| 9,748,873 | B2 * | 8/2017 | Bock | H01H 9/56 |
| 9,806,641 | B2 * | 10/2017 | Bock | H01H 47/002 |
| 9,806,642 | B2 * | 10/2017 | Bock | H02P 1/52 |
| 10,074,497 | B2 * | 9/2018 | Bock | H01H 47/22 |
| 10,141,143 | B2 * | 11/2018 | Bock | H01H 50/002 |
| 10,262,811 | B2 * | 4/2019 | De Natale | H01H 9/167 |
| 10,361,051 | B2 * | 7/2019 | Bock | H01H 9/563 |
| 2007/0252599 | A1 * | 11/2007 | Zhou | H01H 9/563 |
| | | | | 324/424 |
| 2007/0252667 | A1 * | 11/2007 | Zhou | H01H 3/227 |
| | | | | 335/16 |
| 2007/0253124 | A1 | 11/2007 | Zhou et al. | |
| 2020/0379046 | A1 * | 12/2020 | Bianco | H01H 3/32 |
| 2021/0098207 | A1 * | 4/2021 | Elmiger | H01H 9/563 |
| 2021/0098216 | A1 * | 4/2021 | Omari | H01H 50/54 |
| 2021/0099108 | A1 * | 4/2021 | Dziekonski | H02P 1/10 |

* cited by examiner

MEDIUM VOLTAGE SWITCHING APPARATUS

The present invention relates to the field of switching apparatuses for medium voltage electric systems (e.g. power distribution grids or switchboards). For the purpose of the present application, the term "medium voltage" (MV) relates to operating voltages at electric power distribution levels, which are higher than 1 kV AC and 2 kV DC up to some tens of kV, e.g. up to 72 kV AC and 100 kV DC.

MV electric systems typically include switching apparatuses, for example circuit breakers, disconnectors, contactors, and the like.

In MV electric systems, switching apparatuses are currently adapted to carry out load management functionalities, for example carrying and breaking currents under normal circuit conditions (including overload conditions) to energize or de-energize an electric load, or protection functionalities, for example breaking currents under specific abnormal circuit conditions (e.g. under short circuit conditions).

Nowadays, switching apparatuses designed to carry out functionalities of a given type often show unsatisfactory performances, if required to carry out functionalities of different type. As an example, a switching apparatus designed to carry out load management functionalities (e.g. capable of breaking currents with synchronized phase angles among the electric phases) generally offers poor performances when required to intervene under short-circuit conditions.

In order to mitigate these issues, electric systems are currently provided with switching apparatuses specifically designed to carry out load management functionalities and switching apparatuses specifically designed to carry out protection functionalities.

Obviously, this approach entails relatively high industrial and installation costs.

In the state of the art, it is still felt the need for technical solutions capable of overcoming or mitigating the technical issues described above.

In order to respond to this need, the present invention provides a MV switching device, according to the following claims and the related dependent claims.

In a general definition, the switching apparatus, according to the invention, comprises:
one or more electric poles, each electrically coupleable with a corresponding electric line;
for each electric pole, a fixed contact and a movable contact. Said movable contact is reversibly movable between a decoupled position from said fixed contact and a coupled position with said fixed contact. Said movable contact moves from said decoupled position to said coupled position during a closing manoeuvre of the switching apparatus and moves from said coupled position to said decoupled position during an opening manoeuvre of the switching apparatus;
actuating means adapted to actuate the movable contacts of said one or more electric poles.

Preferably, said actuating means comprises an actuator for each electric pole. Each actuator is adapted to actuate the movable contact of the corresponding electric pole in response to control signals provided by said control unit.

Preferably, said actuating means comprise at least a servomotor.

The switching apparatus, according to the invention, is operatively coupled with or comprises a control unit to control said actuating means.

Said control unit comprises a plurality of input arrangements, at which said control unit can receive input signals provided by one or more devices operatively coupled with or included in said control unit.

Said control unit is adapted to carry out a plurality of selectable control routines to control said actuating means during a manoeuvre of said switching apparatus.

Said control unit is adapted to select and carry out a selectable control routine in response to receiving an input signal at an input arrangement corresponding to said selectable routine, basing on information provided by said input signal.

According to an aspect of the invention, said control unit is adapted to carry out a first group of control routines to control said actuating means during a manoeuvre of said switching apparatus. The control routines of said first group of control routines are configured so that said switching apparatus implements protection functionalities, when said control unit carries out said control routines.

Preferably, said control unit comprises a first group of input arrangements. Said control unit is adapted to select and carry out a selectable control routine of said first group of control routines in response to receiving an input signal at a corresponding input arrangement of said first group of input arrangements.

According to an aspect of the invention, said control unit is adapted to carry out a second group of control routines to control said actuating means during a manoeuvre of said apparatus. The control routines of said second group of control routines are configured so that said switching apparatus implements load management functionalities, when said control unit carries out said control routines.

Preferably, said control unit comprises a second group of input arrangements. Said control unit is adapted to select and carry out a selectable control routine of said second group of control routines in response to receiving an input signal at a corresponding input arrangement of said second group of input arrangements.

Conveniently, said first group of input arrangements is assigned with a higher priority with respect to said second group of input arrangements.

According to some embodiments of the invention, one or more of said input arrangements are binary input modules adapted to receive and process binary input signals.

According to some embodiments of the invention, one or more of said input arrangements are comparator modules adapted to receive and process input signals varying continuously in time by comparing said input signals with suitable threshold levels.

In a further aspect, the present invention relates to a control unit for a MV switching device, according to the following claims.

Characteristics and advantages of the invention will emerge from the description of preferred, but not exclusive embodiments of the control unit, according to the invention, non-limiting examples of which are provided in the attached drawings, wherein.

With reference to the figures, the present invention relates to a medium voltage (MV) switching apparatus 1.

In principle, the MV switching apparatus 1 may be of any type suitable for installation in power grids, for example a circuit breaker, a disconnector, a contactor, or another device of similar type.

Preferably, the switching apparatus 1 is of the vacuum operating type, as shown in the cited figures.

However, according to alternative embodiments (not shown), the switching apparatus 1 may be of an air-insulated type or gas-insulated type.

According to a general definition, the switching apparatus 1 comprises a pole section 11 and a basement 12, which respectively include the electric poles 2 and the main actuation components 5, 6 of the switching apparatus.

Figure 1:
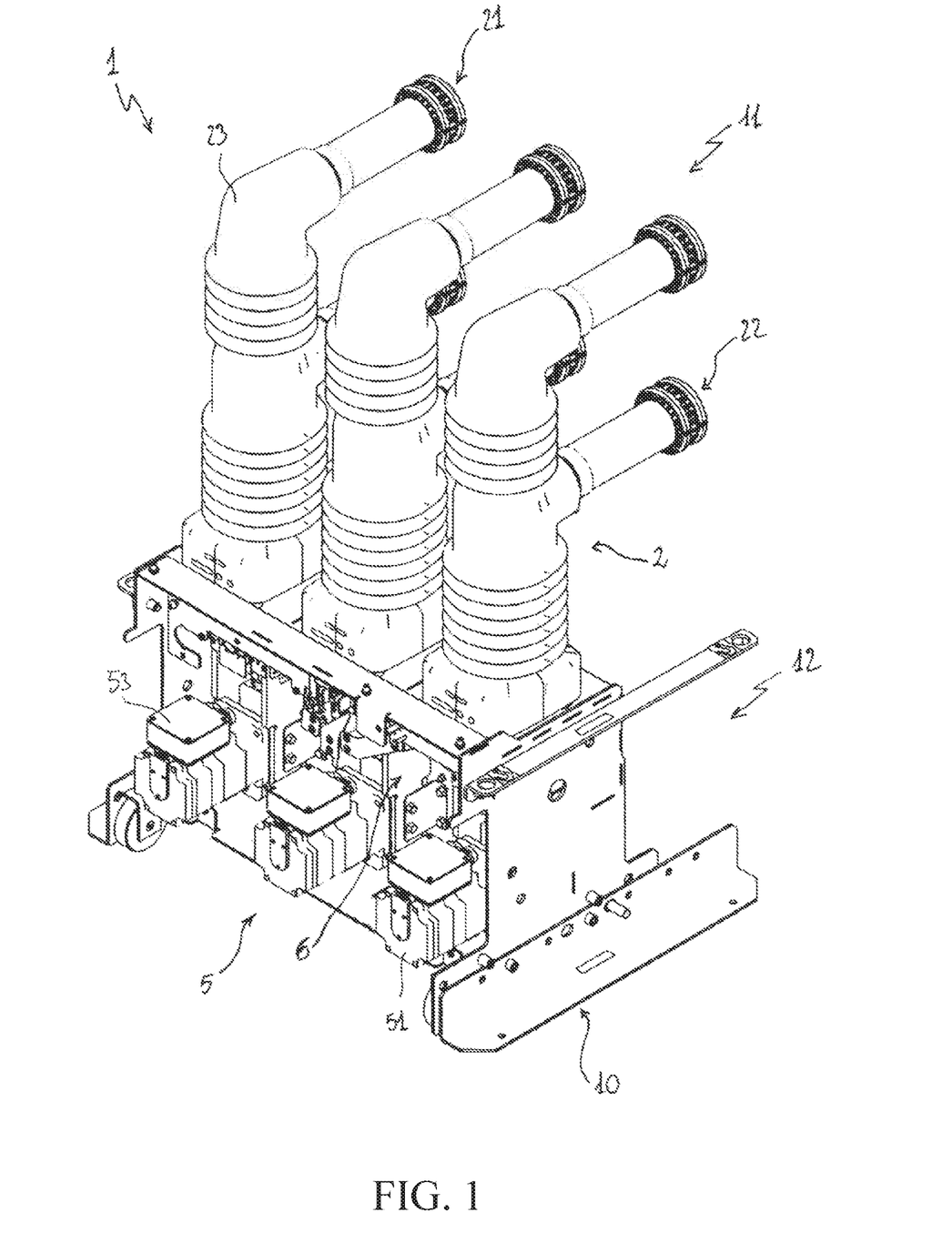
FIGS. 1-3 are schematic views of a MV switching apparatus, according to the invention.
Figure 2:
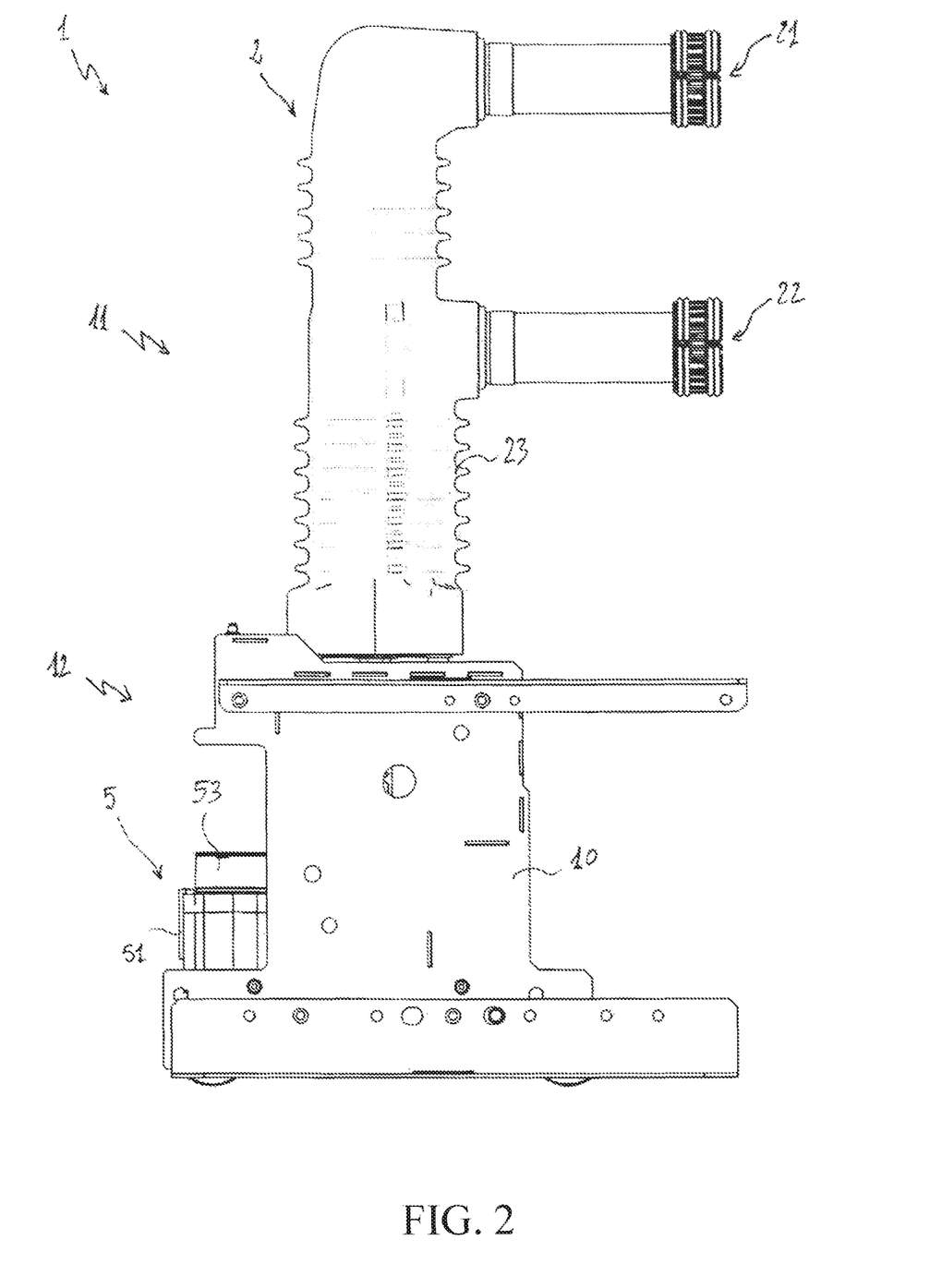
Figure 3:
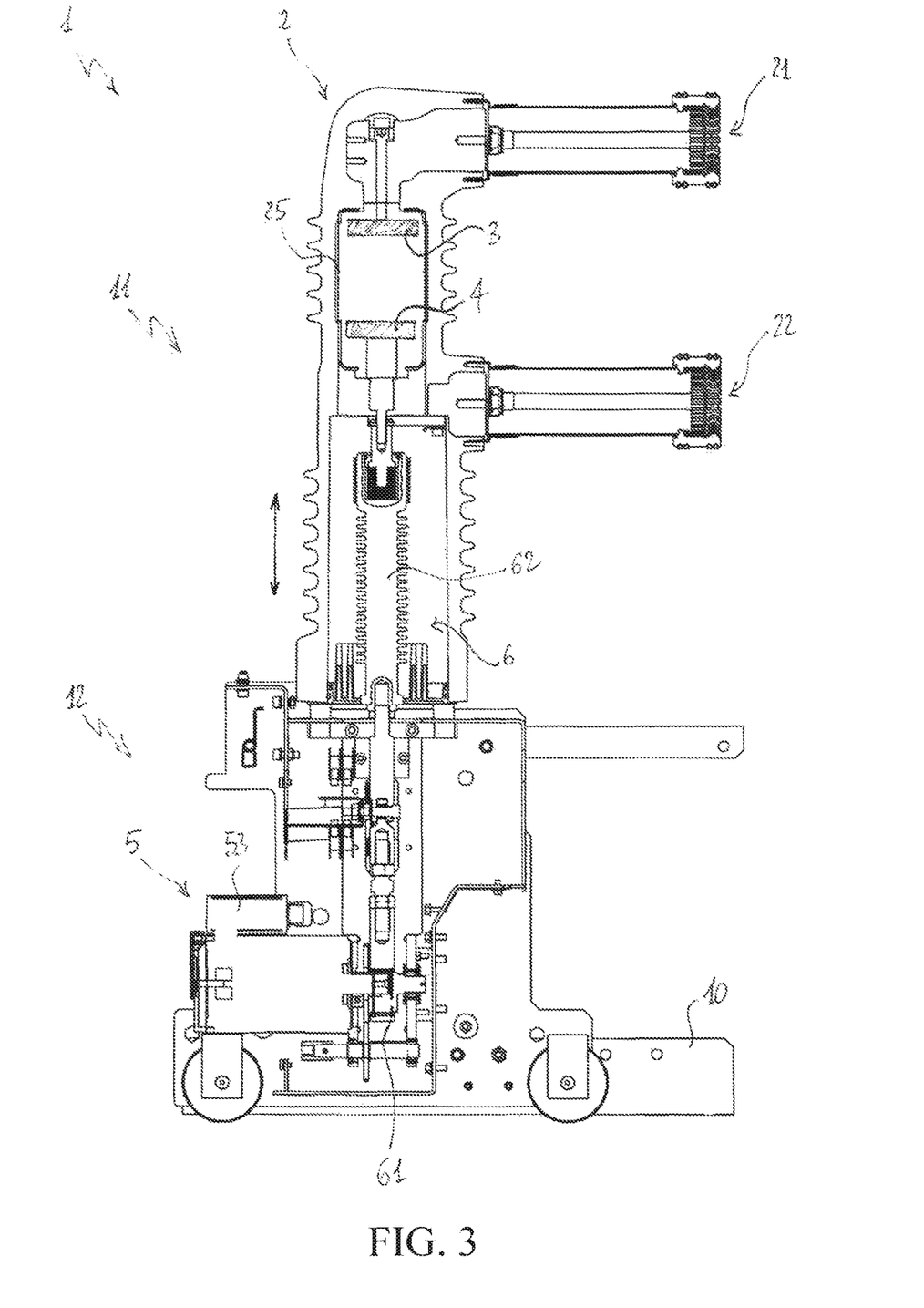

Referring to a normal installation position of the switching apparatus 1, shown in FIGS. 1-3, the pole section 11 is overlapped to the basement 12.

Conveniently, the switching apparatus 1 comprises an outer frame 10, which may at least be partially made of electrically insulating material of known type.

At the pole section 11, the switching apparatus 1 comprises one or more electric poles 2. Preferably, the switching apparatus 1 is of the multi-phase (e.g. three-phase) type and it thereby comprises a plurality (e.g. three) of electric poles 2.

However, according to alternative embodiments (not shown), the switching apparatus 1 may be of the single-phase type and include a single electric pole.

Preferably, each electric pole 2 comprises a corresponding insulating housing 23, which is conveniently fixed to the basement 12.

Preferably, each insulating housing 23 is formed by an elongated (e.g. cylindrical) hollow body of electrically insulating material of known type.

Preferably, each insulating housing 23 defines an internal volume, in which the components of the corresponding electric pole 2 are accommodated.

Advantageously, each electric pole 2 comprises a first pole terminal 21 and a second pole terminal 22, which may be mechanically fixed to the corresponding housing 23 by means of suitable flanges.

The pole terminals 21, 22 are adapted to be electrically connected with corresponding electric conductors (e.g. a phase conductors) of an electric line.

For each electric pole 2, the switching apparatus 1 comprises a fixed contact 3 and a movable contact 4, which are in electrical connection with the first and second pole terminals 21, 22, respectively.

Each movable contact 4 is reversibly movable along a corresponding displacement axis, which conveniently coincides with or is parallel to the main longitudinal axis of the corresponding electric pole 2.

In particular, each movable contact 4 is reversibly movable (see the corresponding bidirectional displacement arrow in FIG. 3) between a decoupled position (opening position) from the corresponding fixed contact 3 and a coupled position (closing position) with the corresponding fixed contact 3.

The transition of the movable contacts 4 from said coupled position to said decoupled position represents an opening manoeuvre of the switching apparatus 1 whereas the transition of the movable contacts 4 from said decoupled position to said coupled position represents a closing manoeuvre of the switching apparatus 1.

When the switching apparatus 1 is of the vacuum operating type as shown in the cited figures, for each electric pole 2, the switching apparatus 1 comprises a vacuum bulb 25, in which a corresponding pair of movable and fixed contacts 3, 4 is placed and can mutually couple/decouple.

The switching apparatus 1 comprises actuating means 5 adapted to actuate the movable contacts 4 of the electric poles 2.

In principle, the actuating means 5 may be of any type, according to the needs. They can thus be of motorised type, e.g. including one or more electric motors (as shown in FIGS. 1-3), of the electromagnetic type, e.g. including one or more actuation coils, or of the mechanical type, e.g. including one or more actuation springs.

Preferably, as shown in the cited figures, the actuating means 5 comprises an actuator 51 for each electric pole 2.

Each actuator 51 is conveniently adapted to actuate the movable contact 4 of the corresponding electric pole 2, on which it is installed.

FIGS. 1-3 show an embodiment of the invention, in which the actuating means 5 include a servomotor unit providing actuation forces to actuate the movable contacts 4.

The servomotor unit 5 preferably comprises, for each electric pole, a servomotor motor 51 having its output shaft operatively coupled to the corresponding movable contact 4 of the electric pole.

Preferably, the servomotor unit 5 comprises, for each servomotor 51, a power and control unit 53 including suitable electric circuits to feed the corresponding electric motor 50 and suitable electronic circuits (e.g. including one or more digital processing unit, such as microprocessors) to control operation of the corresponding servomotor 51, for example in response to suitable control signals received from a control unit.

Conveniently, the switching apparatus 1 comprises a motion transmission assembly 6 adapted to operatively couple the actuating means 5 with the movable contacts 4 of the electric poles 2.

In principle, the motion transmission assembly 6 may be of any type, according to the needs.

In the embodiment shown in FIGS. 1-3, the motion transmission assembly 6 comprises, for each electric pole 2, an eccentric motion transmission mechanism 61 conveniently arranged in such a way to be actuated by rotational mechanical forces provided by a corresponding servomotor 51 and transmit, in turn, translational mechanical forces to actuate the movable contact 4 of the corresponding electric pole 2 during an opening manoeuvre or a closing manoeuvre of the switching apparatus.

In the embodiment shown in FIGS. 1-3, the motion transmission assembly 6 further comprises, for each electric pole 2, a rod arrangement 62 (e.g. including a plurality of mutually coupled transmission rods) adapted to be actuated by translational mechanical forces provided by the corresponding eccentric mechanism 61 and transmit, in turn, translational mechanical forces to the movable contact 4 of the corresponding electric pole 2 during an opening manoeuvre or a closing manoeuvre of the switching apparatus.

In general, the electric poles 2, the actuating means 5 and the motion transmission assembly 6 of the switching apparatus 1 may be of known type and they will not here be described in more details for the sake of brevity.

As an example, they may be configured and operate as in the switching apparatus disclosed in the European patent application nr. EP17154638.5.

According to the invention, the switching apparatus 1 is operatively associated to or comprises a control unit 7 adapted to manage the operation of the switching apparatus 1.

In principle, the control unit 7 may be formed by any Intelligent Electronic Device (IED) suitably configured to carry out control functionalities of a switching apparatus.

As an example, the control unit 7 may be a controller for electric power grids or switchboards.

Conveniently, the control unit 7 comprises computerised means 70 (which may include suitable digital processing resources, e.g. one or more microprocessors or DSPs) adapted to receive and execute software instructions in order to carry out the foreseen control functionalities, implement suitable control arrangements, receive, process and provide data signals and/or control signals, and the like.

Preferably, the control unit 7 is part of the switching apparatus 1 and it is conveniently arranged on board or in proximity of the basement 12.

However, the control unit 7 may be a computerised device operatively associated with the switching apparatus 1 and, possibly, arranged in a remote position with respect to these latter. Conveniently, the control unit 7 is adapted to control the actuating means 5.

Figure 4:
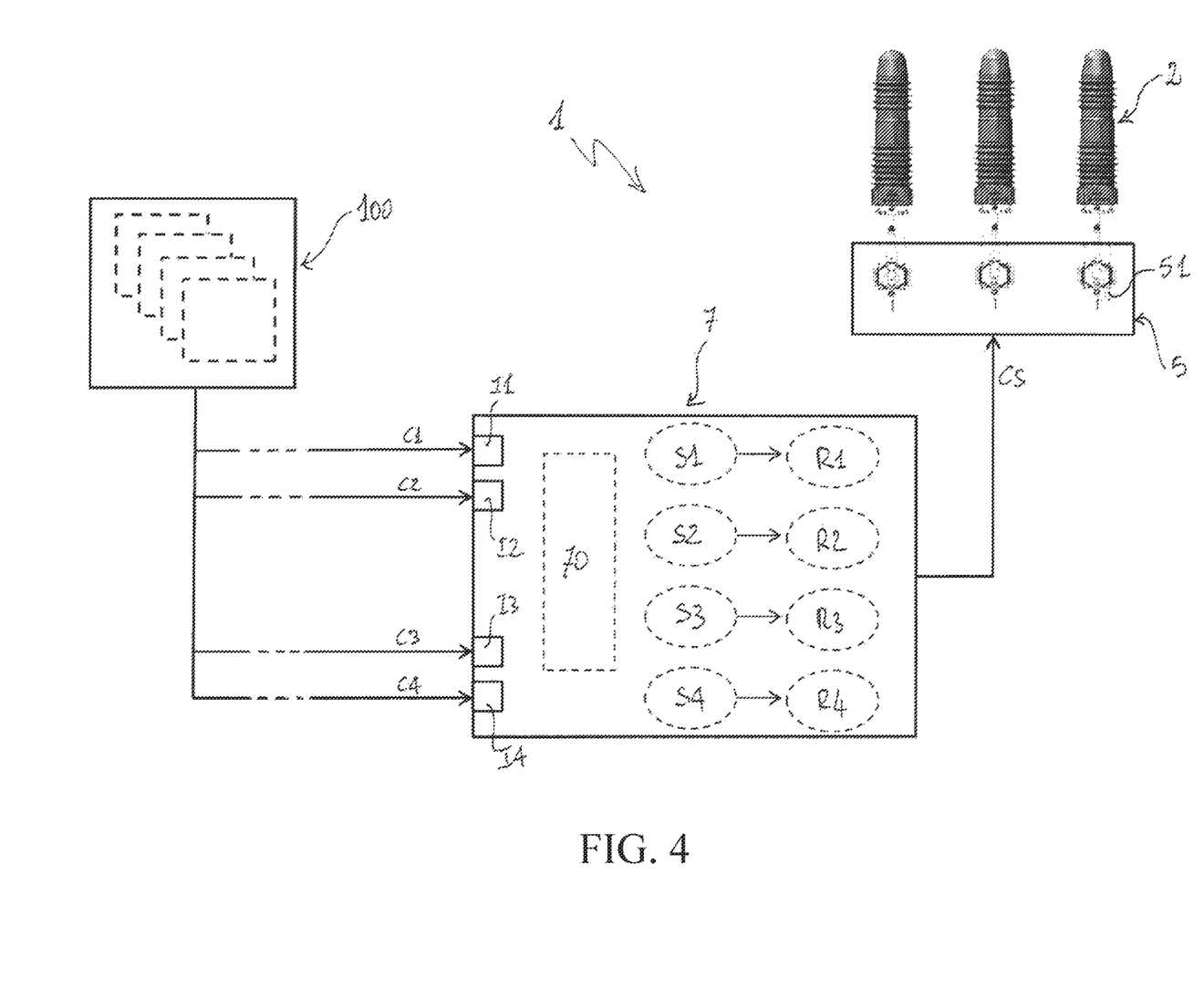
FIG. 4 is a schematic view of the control unit, according to different embodiments of the invention.

To this aim, in operation, the control unit 7 provides suitable control signals CS to the actuators 51 of the actuating means 5 (FIG. 4).

According to the invention, the control unit 7 comprises a plurality of input arrangements I1, I2, I3, I4, at which said control unit receives input signals C1, C2, C3, C4 provided by one or more devices 100 operatively coupled with or included in said control unit.

Input modules I1, I2, I3, I4 are conveniently configured to receive and process the input signals C1, C2, C3, C4 in such a way to obtain input information that is then processed by the computerised means of the control unit 7.

Preferably, the input signals C1, C2, C3, C4 are binary input signals and the input arrangements I1, I2, I3, I4 are binary input modules configured to receive and process the binary input signals C1, C2, C3, C4.

For the purposes of the present invention, a binary signal is here assumed to be a signal taking a logical state "high" or a logical state "low", at any time.

As an example, in the field MV electric systems, a binary signal may be a voltage signal taking two different voltage levels at any time, namely a higher voltage level (e.g. some tens of V) representing a "high" logical state of the binary signal, and a lower voltage level (e.g. 0 V), representing a "low" logical state of the binary signal.

According to further embodiments, the input signals C1, C2, C3, C4 may be of the type varying continuously in time (in practice of analog type)) and the input arrangements I1, I2, I3, I4 are comparator modules configured to receive and process such input signals C1, C2, C3, C4 by comparing said input signals with suitable threshold levels.

As an example, in the field MV electric systems, a signal varying continuously in time may be a voltage signal indicative of the behaviour of an electric quantity, which is provided by a sensor arrangement.

Devices 100 may include protection relays, sensor arrangements, controllers, computerised devices, computerised platforms, servers and, more in general, any device suitable for interaction with the control unit 7.

Devices 100 are generally external to the control unit 7 and they may be arranged in the electric system where the switching apparatus 1 is installed or they may be provided remotely with respect to this latter, even at cloud computing level.

Devices 100 may however be embedded in the control unit 7. As an example, a device 100 may be a magnetic field sensor incorporated in the control unit 7.

According to the invention, the control unit 7 is adapted to carry out a plurality of selectable control routines R1, R2, R3, R4 to control the actuating means 5 during a closing or opening manoeuvre of the switching apparatus.

For the sake of clarity, it is specified that, for the purposes of the present invention, the term "control routine" identifies a sequence of control steps (in practice a control procedure) to control the actuating means 5.

Conveniently, the control unit 7 carries out a given selectable control routine R1, R2, R3, R4 through the execution of a corresponding stored set of software instructions by the computerised means 70.

Thus, when a control routine R1, R2, R3, R4 is selected, the computerised means 70 execute a set of instructions corresponding to said control routine to carry out said control routine. Conveniently, the control unit 7 is adapted to store different sets S1, S2, S3, S4 of software instructions executable by the computerised means 70. Each set of software instructions corresponds to a selectable control routine R1, R2, R3, R4 that can be carried out by the control unit 7.

When the control unit 7 carries out a selectable control routine R1, R2, R3, R4 to control the actuating means 5 during a manoeuvre of said switching apparatus, said actuating means actuate the movable contacts 4 of the electric poles 2 in such a way to implement a corresponding motion law L1, L2, L3, L4 for said movable contacts.

Figure 5:
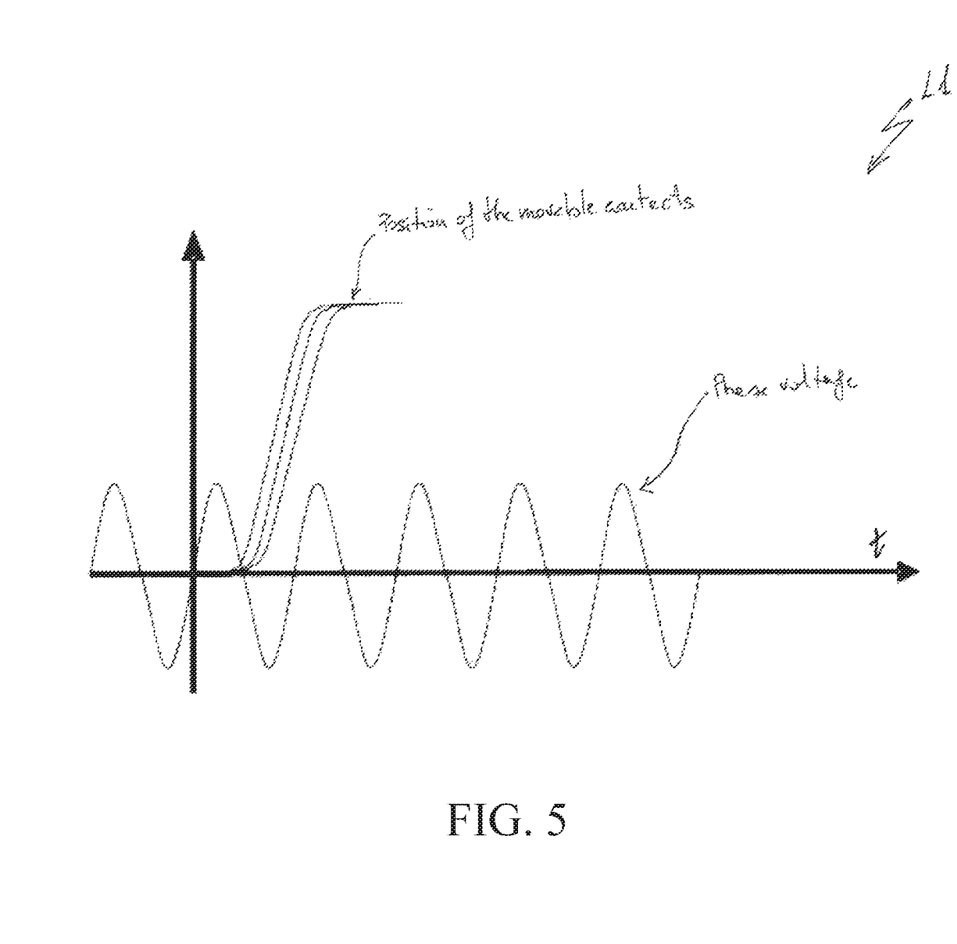
FIGS. 5-8 are schematic examples of motion laws for the mobile contacts, which can be implemented during a manoeuvre of the switching apparatus, according to the invention.

In FIG. 5, a first motion law L1 for the movable contacts 4 is shown.

According to such a motion law, the movable contacts 4 are actuated at a given instants (e.g. zero-crossing instants) of the phase voltage without any synchronization of the phase angles among the electric phases.

As it is apparent, such a motion law for the movable contacts 4 is particularly suitable for being implemented when protection functionalities (for example a load disconnection under short-circuit conditions) have to be implemented by the switching apparatus 1 through an opening manoeuvre.

Conveniently, the first motion law L1 for the movable contacts 4 may be implemented when the control unit 7 carries out a corresponding selectable first control routine R1 to control the actuating means 5.

Figure 6:
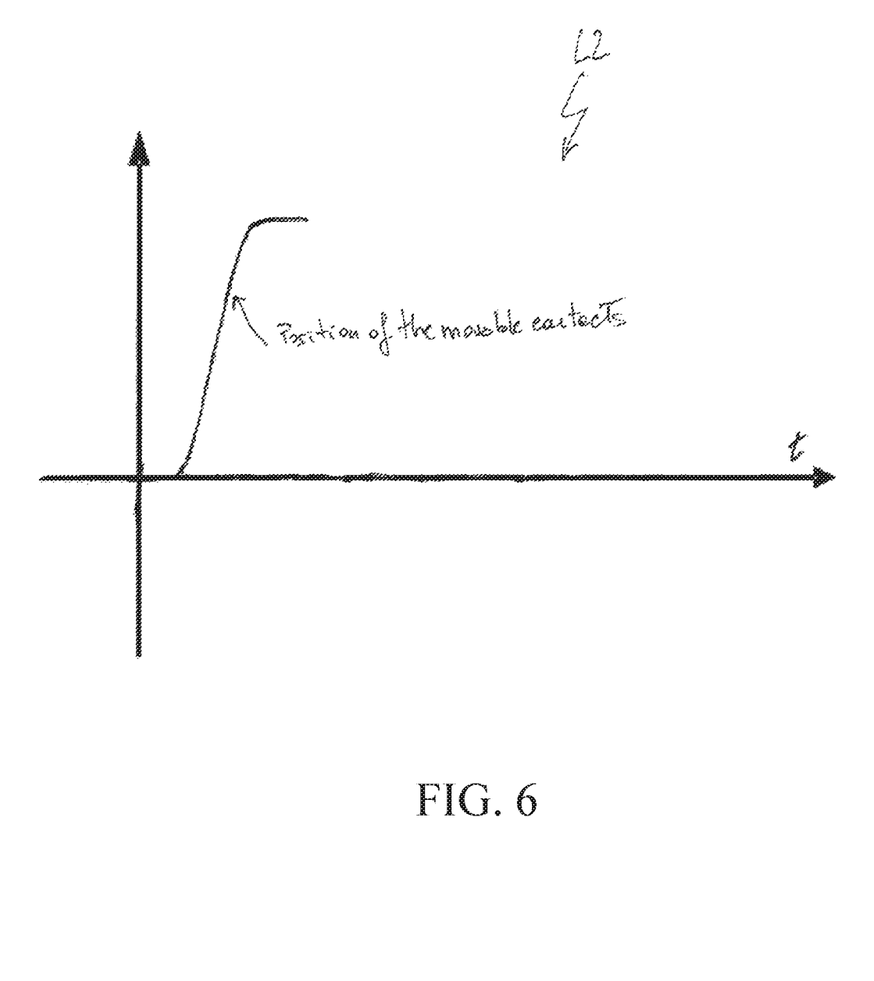

In FIG. 6, a second motion law L2 for the movable contacts 4 is shown.

According to such a motion law, the movable contacts 4 are actuated with a relatively sharp speed profile (fast opening manoeuvre).

As it is apparent, also this second motion law for the movable contacts 4 is particularly suitable for being implemented when protection functionalities have to be implemented by the switching apparatus 1 through an opening manoeuvre.

Conveniently, the second motion law L2 for the movable contacts 4 may be implemented when the control unit 7 carries out a corresponding selectable second control routine R2 to control the actuating means 5.

Figure 7:
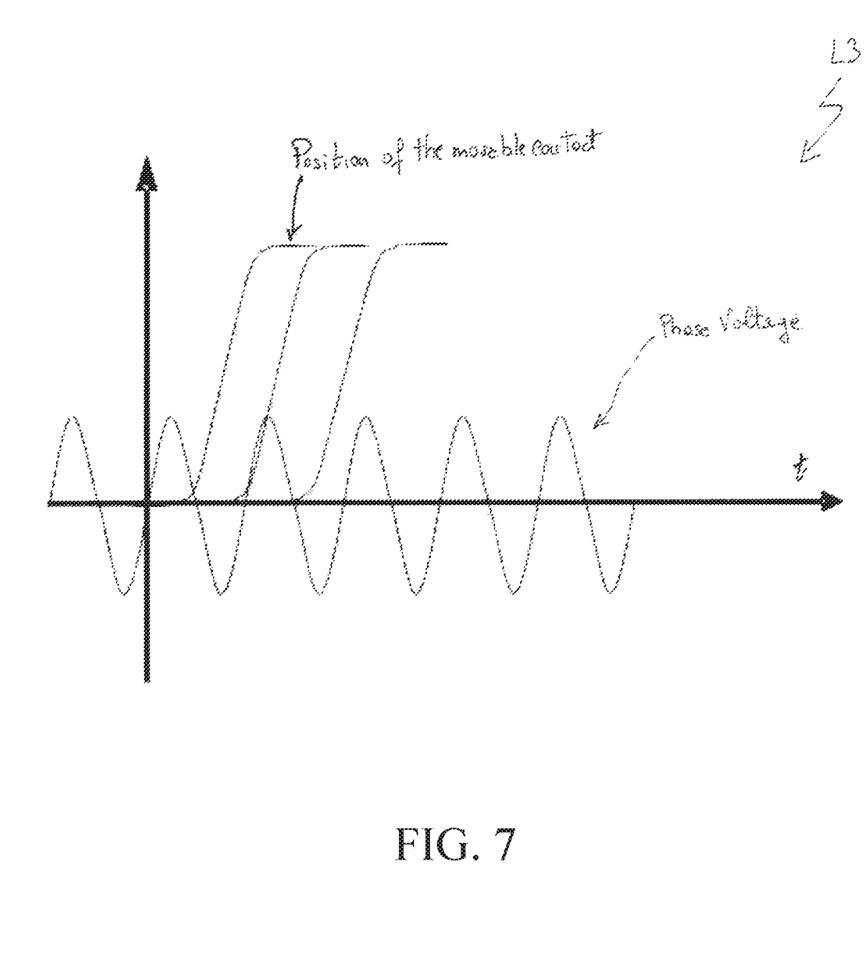

In FIG. 7, a third motion law L3 for the movable contacts 4 is shown.

According to such a motion law, the movable contacts 4 are actuated at different given zero-crossings of the phase voltage with synchronized phase angles among the electric phases.

As it is apparent, this motion law for the movable contacts 4 is particularly suitable for being implemented when load management functionalities (for example a load disconnection under normal conditions) have to be implemented by the switching apparatus 1 through an opening manoeuvre.

Conveniently, the third motion law L3 for the movable contacts 4 may be implemented when the control unit 7 carries out a corresponding selectable third control routine R3 to control the actuating means 5.

Figure 8:
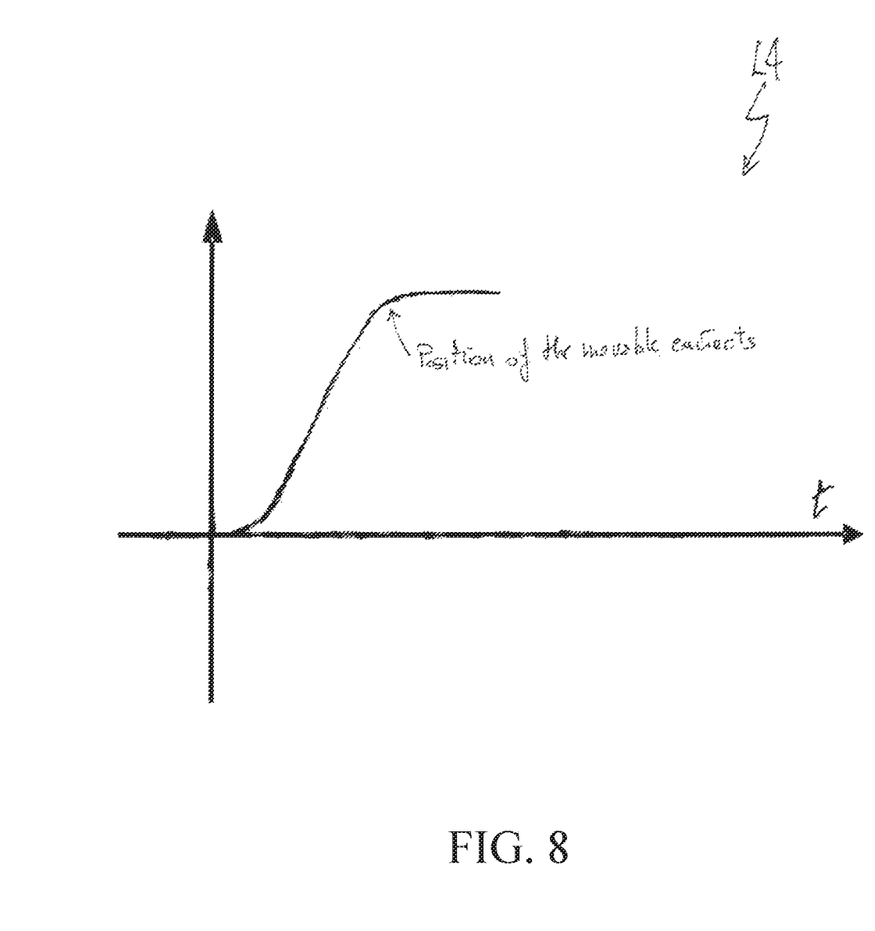

In FIG. 8, a fourth motion law L4 for the movable contacts 4 is shown.

According to such a motion law, the movable contacts 4 are actuated with a relatively smooth speed profile (slow opening manoeuvre).

As it is apparent, also this motion law for the movable contacts 4 is particularly suitable for being implemented when load management functionalities have to be implemented by the switching apparatus 1 through an opening manoeuvre.

Conveniently, the fourth motion law L4 for the movable contacts 4 may be implemented when the control unit 7 carries out a corresponding selectable fourth control routine R4 to control the actuating means 5.

As it is evident to the skilled person, additional examples of motion laws for the movable contacts may be conceived in relation to both closing and opening manoeuvres of the movable contacts 4.

It is important to notice that each conceivable motion law for the movable contacts 4 is conveniently operatively implemented when the control unit 7 carries a corresponding control routine to control the actuating means 5 during a manoeuvre of the switching apparatus 1.

According to the invention, the control unit 7 is adapted to select and carry out a selectable control routine R1, R2, R3, R4 in response to receiving an input signal C1, C2, C3, C4 at an input arrangement I1, I2, I3, I4 corresponding to said selectable routine and basing on information provided by the received input signal.

In practice, when it receives an input signal C1, C2, C3, C4 at an input arrangement I1, I2, I3, I4 (for example a binary voltage signal at a "high logic" state provided by a relay or an analog voltage signal exceeding a given threshold provided by a sensing arrangement), the control unit 7 selects the control routine R1, R2, R3, R4 corresponding to said input module and carries out such a control routine to control the actuating means 5 during a manoeuvre of said switching apparatus.

In order to operate the selection of a given control routine R1, R2, R3, R4, the computerised means 70 conveniently execute a stored set of software instructions to process the input information provided by the input arrangement I1, I2, I3, I4 receiving the input signal C1, C2, C3, C4.

Preferably, the control unit 7 is adapted to carry out a first group of control routines to control the actuating means 5.

Conveniently, said first group of control routines comprises one or more control routines configured so that the switching apparatus 1 implements protection functionalities, when said control unit 7 carries out said control routines.

Referring to FIGS. 4-6, the above-mentioned first group of control routines may include the above-mentioned first and second control routines R1, R2 implementing the motion laws L1, L2 for the movable contacts 4, when carried out by the control unit 7.

In fact, as illustrated above, when the control unit 7 carries out a selectable control routine R1 or R2 to control the actuating means 5, the actuating means 5 actuate the movable contacts 4 of the electric poles 2 in such a way to implement a corresponding first motion law L1 or second motion law L2 for said movable contacts, which motion laws are particularly suitable for being implemented when the switching apparatus 1 has to implement protection functionalities, as discussed above.

Preferably, the control unit 7 comprises a first group of input arrangements adapted to receive input signals provided by the devices 100.

Preferably, the control unit 7 is adapted to select and carry out a selectable control routine of said first group of control routines in response to receiving an input signal at a corresponding input arrangement of said first group of input arrangements.

Referring to FIG. 4, the above-mentioned first group of input arrangements may include the above-mentioned first and second input arrangements I1, I2 of the control unit 7.

In fact, as illustrated above, the control unit 7 is adapted to select and carry out a selectable control routine R1 or R2 of said first group of control routines in response to receiving an input signal C1 or C2 at a corresponding input arrangement I1 or I2.

Preferably, the control unit 7 is adapted to carry out a second group of control routines to control said actuating means 5.

Conveniently, the second group of control routines comprises one or more control routines configured so that the switching apparatus 1 implements load management functionalities, when said control unit 7 carries out said control routines.

Referring to FIGS. 4 and 7-8, the above-mentioned second group of control routines may include the above-mentioned third and fourth control routines R3, R4 that implement the motion laws L3, L4 for the movable contacts 4, when carried out by the control unit 7.

In fact, as illustrated above, when the control unit 7 carries out a selectable control routine R3 or R4 to control the actuating means 5, the actuating means 5 actuate the movable contacts 4 of the electric poles 2 in such a way to implement a corresponding third motion law L3 or fourth motion law L4 for said movable contacts, which motion laws may be adopted when the switching apparatus 1 has to implement load management functionalities, as discussed above. Preferably, the control unit 7 comprises a second group of input arrangements adapted to receive input signals provided by the devices 100.

Preferably, the control unit 7 is adapted to select and carry out a selectable control routine of the second group of control routines in response to receiving an input signal at a corresponding input arrangement of the second group of input arrangements.

Referring to FIG. 4, the above-mentioned second group of input arrangements may include the above-mentioned third and fourth input arrangements I3, I4 of the control unit 7.

In fact, as illustrated above, the control unit 7 is adapted to select and carry out a selectable control routine R3 or R4 of the second group of control routines in response to receiving an input signals C3 or C4 at a corresponding input arrangement I3 or I4.

Preferably, the input arrangements I1, I2 of the first group of input arrangements are assigned with a higher priority with respect to the input arrangements I3, I4 the second group of input arrangements.

Thus, if the control unit 7 simultaneously (i.e. within a given time interval, e.g. in the order of ms) receives an input signal C1 at an input arrangement I1 of the first group of input arrangements and an input signal C3 at an input arrangement I3 of the second group of input arrangements, it carries out the control routine R1 corresponding to the input arrangement I1 and it does not carry out the control routine R3 corresponding to the input arrangement I3.

Similarly, if the control unit 7 receives an input signal C1 at an input arrangement I1 of the first group of input arrangements later than an input signal C3 at an input arrangement I3 of the second group of input arrangements, it carries out the control routine R1 corresponding to the input arrangement I1 and it does not carry out the control routine R3 corresponding to the input arrangement I3, if the execution of the latter control routine R3 has not yet started.

In practice, receiving an input signal C1 at an input arrangement I1 of the first group of input arrangements overrules receiving an input signal C3 at an input arrangement I3 of the second group of input arrangements, if the execution of the control routine R3 corresponding to the input arrangement I3 of the second group of input arrangements has not yet started.

The present invention provides remarkable advantages with respect to known solutions of the state of the art.

As it is capable of carrying out different selectable control routines R1, R2, R3, R4 in response to input signals C1, C2, C3, C4 at corresponding different input arrangements I1, I2, I3, I4, the control unit 7 can command the actuating means 5 to operate according to different operating modes, each implementing a different motion law L1, L2, L3, L4 for the movable contacts 4 of the electric poles 2.

The switching apparatus 1 can thus implement different types of functionalities, each selectable in a simple manner by a corresponding input signal C1, C2, C3, C4 without intervening at hardware or software level on the switching apparatus itself.

The switching apparatus 1 is thus characterised by a high flexibility of use, which makes it suitable for properly implementing both load management and protection functionalities.

Thanks to these capabilities of the switching apparatus 1, the layout of an electric system (e.g. of a power distribution grid) may be greatly simplified with remarkable savings in terms of industrial and installation costs.

The switching apparatus 1, according to the invention, is characterised by high levels of reliability for the intended applications.

The switching apparatus 1, according to the invention, is of relatively easy and cheap industrial production and installation on the field.

The invention claimed is:

1. A medium voltage switching apparatus comprising:
   one or more electric poles, each electrically coupleable with a corresponding electric line;
   for each of the electric poles, a fixed contact and a movable contact, said movable contact being reversibly movable between a decoupled position from said fixed contact and a coupled position with said fixed contact, said movable contact moving from said decoupled position to said coupled position during a closing manoeuvre of the switching apparatus and moving from said coupled position to said decoupled position during an opening manoeuvre of the switching apparatus;
   actuating means adapted to actuate the movable contacts of said one or more electric poles;
   wherein said switching apparatus is operatively coupled with or comprises a control unit to control said actuating means;
   wherein said control unit comprises a plurality of input arrangements, at which said control unit can receive input signals provided by one or more devices operatively coupled with or included in said control unit,
   wherein said control unit is adapted to carry out a plurality of selectable control routines to control said actuating means during a manoeuvre of said switching apparatus,
   wherein said control unit is adapted to select and carry out one of the selectable control routines in response to receiving one of the input signals at one of the input arrangements corresponding to said selectable control routine, and
   wherein, when said control unit carries out said selectable control routine to control said actuating means during the manoeuvre of said switching apparatus, said actuating means actuating the movable contacts of said electric poles in such a way to implement a motion law for said movable contacts, which corresponds to said selectable control routine.

2. The switching apparatus, according to claim 1, wherein said control unit is adapted to carry out a first group of the selectable control routines to control said actuating means during the manoeuvre of said switching apparatus, each control routine of said first group of the selectable control routines being configured so that said switching apparatus implements protection functionalities, when said control unit carries out the control routine of said first group of said selectable control routines.

3. The switching apparatus, according to claim 2, wherein said control unit comprises a first group of the input arrangements, wherein said control unit is adapted to select and carry out the control routine of said first group of the selectable control routines in response to receiving one of the input signals at a corresponding one of the input arrangements of said first group of the input arrangements.

4. The switching apparatus, according to claim 3, wherein said control unit is adapted to carry out a second group of the selectable control routines to control said actuating means during another manoeuvre of said switching apparatus, each control routine of said second group of the selectable control routines being configured so that said switching apparatus implements load management functionalities, when said control unit carries out the control routine of said second group of said selectable control routines.

5. The switching apparatus, according to claim 4, wherein said control unit comprises a second group of the input arrangements, wherein said control unit is adapted to select and carry out the control routine of said second group of the selectable control routines in response to receiving one of the input signals at a corresponding one of the input arrangements of said second group of the input arrangements.

6. The switching apparatus, according to claim 5, wherein said first group of the input arrangements is assigned with a higher priority with respect to said second group of the input arrangements.

7. The switching apparatus, according to claim 6, wherein one or more of said input arrangements is a binary input module adapted to receive and process a binary input signal.

8. The switching apparatus, according to claim 7, wherein another one or more of said input arrangements is a comparator module adapted to receive and process an input signal varying continuously in time.

9. The switching apparatus, according to claim 8, wherein said actuating means comprises an actuator for each of the electric poles, each actuator being adapted to actuate the movable contact of the corresponding one of the electric poles in response to control signals provided by said control unit.

10. The switching apparatus, according to claim 9, wherein said actuating means comprises at least a servomotor.

11. The switching apparatus, according to claim 2, wherein said control unit is adapted to carry out a second group of the selectable control routines to control said actuating means during another manoeuvre of said switching apparatus, each control routine of said second group of the selectable control routines being configured so that said switching apparatus implements load management functionalities, when said control unit carries out the control routine of said second group of said selectable control routines.

12. The switching apparatus, according to claim 11, wherein said control unit comprises a second group of the input arrangements, wherein said control unit is adapted to select and carry out the control routine of said second group of the selectable control routines in response to receiving one of the input signals at a corresponding one of the input arrangements of said second group of the input arrangements.

13. The switching apparatus, according to claim 1, wherein said control unit is adapted to carry out a second group of the selectable control routines to control said actuating means during the manoeuvre of said switching apparatus, each control routine of said second group of the selectable control routines being configured so that said switching apparatus implements load management functionalities, when said control unit carries out the control routine of said second group of said selectable control routines.

14. The switching apparatus, according to claim 1, wherein one or more of said input arrangements is a binary input module adapted to receive and process a binary input signal.

15. The switching apparatus, according to claim 1, wherein one or more of said input arrangements is a comparator module adapted to receive and process an input signal varying continuously in time.

16. The switching apparatus, according to claim 1, wherein said actuating means comprises an actuator for each of the electric poles, each actuator being adapted to actuate the movable contact of the corresponding one of the electric poles in response to control signals provided by said control unit.

17. The switching apparatus, according to claim 1, wherein said actuating means comprises at least a servomotor.

18. A control unit for a medium voltage switching apparatus, wherein said switching apparatus comprises: one or more electric poles, each electrically coupleable with a corresponding electric line; for each of the electric poles, a fixed contact and a movable contact, said movable contact being reversibly movable between a decoupled position from said fixed contact and a coupled position with said fixed contact, said movable contact moving from said decoupled position to said coupled position during a closing manoeuvre of the switching apparatus and moving from said coupled position to said decoupled position during an opening manoeuvre of the switching apparatus; actuating means controlled by said control unit and adapted to actuate the movable contacts of said one or more electric poles; wherein said control unit comprises:
- a plurality of input arrangements, at which said control unit can receive input signals provided by one or more devices operatively coupled with or included in said control unit,
- wherein said control unit is adapted to carry out a plurality of selectable control routines to control said actuating means during a manoeuvre of said switching apparatus,
- wherein said control unit is adapted to select and carry out one of the selectable control routines in response to receiving one of the input signals at one of the input arrangements corresponding to said selectable control routine, and
- wherein, when said control unit carries out said selectable control routine to control said actuating means during the manoeuvre of said switching apparatus, said actuating means actuating the movable contacts of said electric poles in such a way to implement a motion law for said movable contacts, which corresponds to said selectable control routine.

* * * * *